US007657673B2

(12) United States Patent
Ueda (10) Patent No.: US 7,657,673 B2
(45) Date of Patent: Feb. 2, 2010

(54) DATA TRANSFER CONTROL DEVICE, IMAGE PROCESSING DEVICE, AND DATA TRANSFER CONTROL METHOD

(75) Inventor: Kenichi Ueda, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 167 days.

(21) Appl. No.: 11/360,516

(22) Filed: Feb. 24, 2006

(65) Prior Publication Data

US 2006/0212662 A1 Sep. 21, 2006

(30) Foreign Application Priority Data

Feb. 25, 2005 (JP) ............... 2005-051599

(51) Int. Cl.
*G06F 3/00* (2006.01)
*G09G 5/399* (2006.01)
(52) U.S. Cl. ............... 710/52; 710/53; 345/539
(58) Field of Classification Search ............ 710/53, 710/52
See application file for complete search history.

(56) References Cited

U.S. PATENT DOCUMENTS

| | | | | |
|---|---|---|---|---|
| 3,863,228 | A | * | 1/1975 | Taylor ............... 714/5 |
| 5,301,351 | A | | 4/1994 | Jippo |
| 5,543,824 | A | * | 8/1996 | Priem et al. ............. 345/539 |
| 5,842,042 | A | | 11/1998 | Kodama et al. |
| 5,884,099 | A | | 3/1999 | Klingelhofer |
| 6,907,479 | B2 | * | 6/2005 | Karnstedt et al. ......... 710/52 |
| 2003/0182506 | A1 | | 9/2003 | Kusumi |
| 2003/0227460 | A1 | * | 12/2003 | Schinnerer ............ 345/539 |
| 2005/0258868 | A1 | | 11/2005 | Komatsu |

FOREIGN PATENT DOCUMENTS

| | | |
|---|---|---|
| JP | 2001-282650 A | 10/2001 |
| JP | 2005-340946 A | 12/2005 |
| TW | 591510 | 6/2004 |
| TW | 200516990 | 5/2005 |
| TW | 1235919 | 7/2005 |

\* cited by examiner

*Primary Examiner*—Henry W. H. Tsai
*Assistant Examiner*—Juanito C Borromeo
(74) *Attorney, Agent, or Firm*—Foley & Lardner LLP (57) ABSTRACT

A data transfer control device, which transfers a large capacity of data speedily and sequentially, has three buffers that are used as a WR (write) buffer, an intermediate buffer, and an RD (read) buffer. To send data sequentially, the data transfer control device switches-over the buffers in one of the following three ways (A), (B), and (C), using determination flags indicating whether the buffers store effective data (data not yet referenced). A buffer control device switches-over (A) the WR buffer and RD buffer if a WR buffer effective flag 33 is on and an intermediate buffer effective flag 34 and an RD buffer effective flag 35 are off, (B) the WR buffer and the intermediate buffer if the WR buffer effective flag 33 and the RD buffer effective flag 35 are on and the intermediate buffer effective flag 34 is off, and (C) the intermediate buffer and the RD buffer if the intermediate buffer effective flag 34 is on and the RD buffer effective flag 35 is off.

17 Claims, 11 Drawing Sheets

| | CONDITION (NEXT STATE) | | SWITCHING OPERATION |
|---|---|---|---|
| | WR (WRITE BUFFER) | INTERMEDIATE (INTERMEDIATE BUFFER) | RD (READ BUFFER) | |
| (A) | STORED (-> EMPTY) | EMPTY | EMPTY (-> STORED) | SWITCH WR AND RD |
| (B) | STORED (-> EMPTY) | EMPTY (-> STORED) | STORED | SWITCH WR AND INTERMEDIATE |
| (C) | N/A | STORED (-> EMPTY) | EMPTY (-> STORED) | SWITCH INTERMEDIATE AND RD |

DATA TRANSFER CONTROL DEVICE, IMAGE PROCESSING DEVICE, AND DATA TRANSFER CONTROL METHOD

FIELD OF THE INVENTION

The present invention relates to a data transfer control device, an image processing device, and a data transfer control method, and more particularly to a data transfer control device and an image processing device with multiple buffers and a data transfer control method for use on those devices.

BACKGROUND OF THE INVENTION

Figure 10:
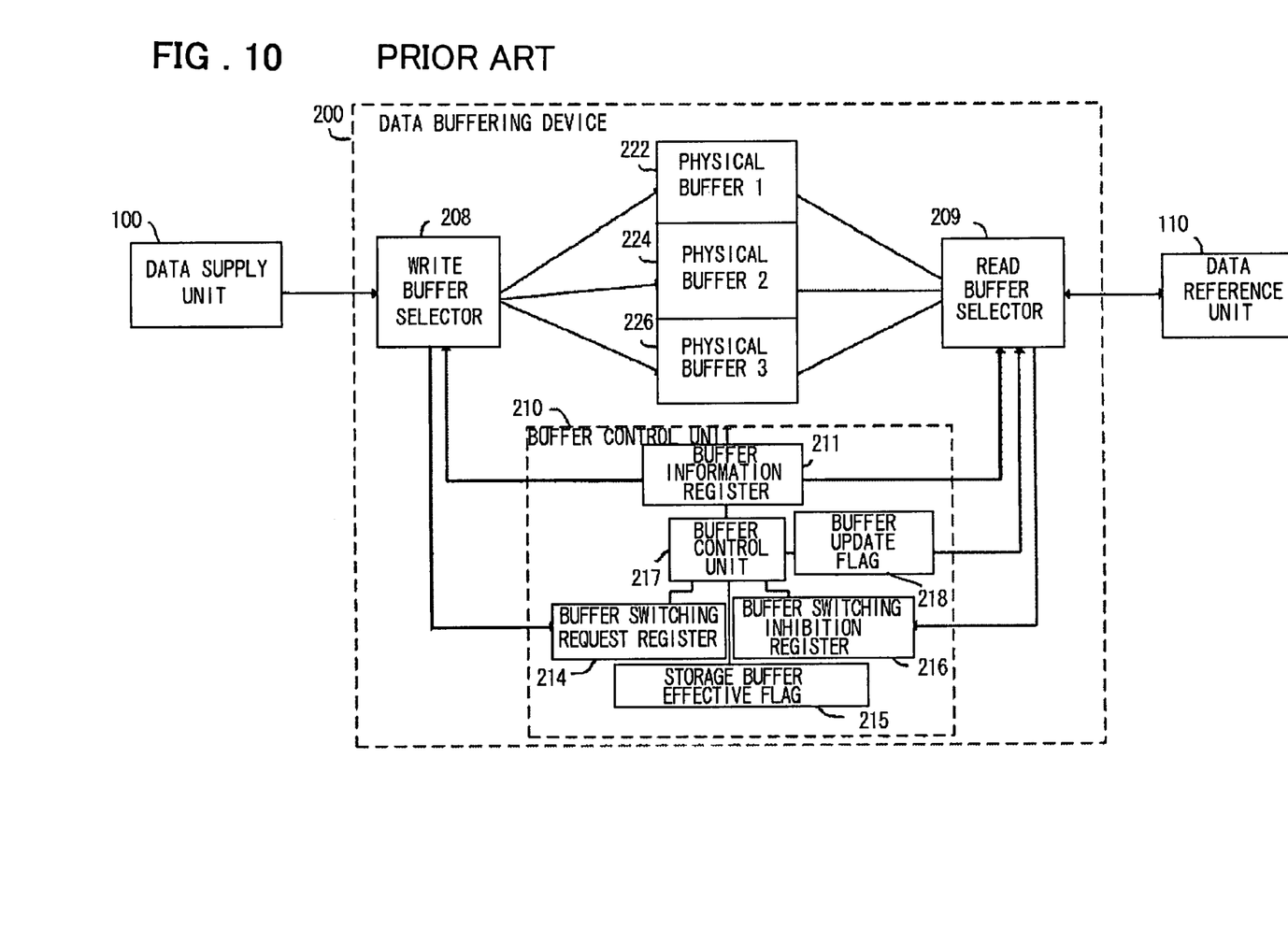
FIG. 10 is a block diagram showing the configuration of a conventional data buffering device.

Conventionally, a data transfer control device with a triple-buffer configuration is known. For example, Patent Document 1 introduces a data buffering device configured in such a way that the buffer in which the most recent data is written can be referenced by priority. FIG. 10 is a diagram showing the configuration of the data buffering device described in Patent Document 1. In this configuration, three physical buffers, 222, 224, and 226 are used as any one of the write buffer, read buffer, and storage buffer based on the information stored in a buffer information register.

Figure 11:
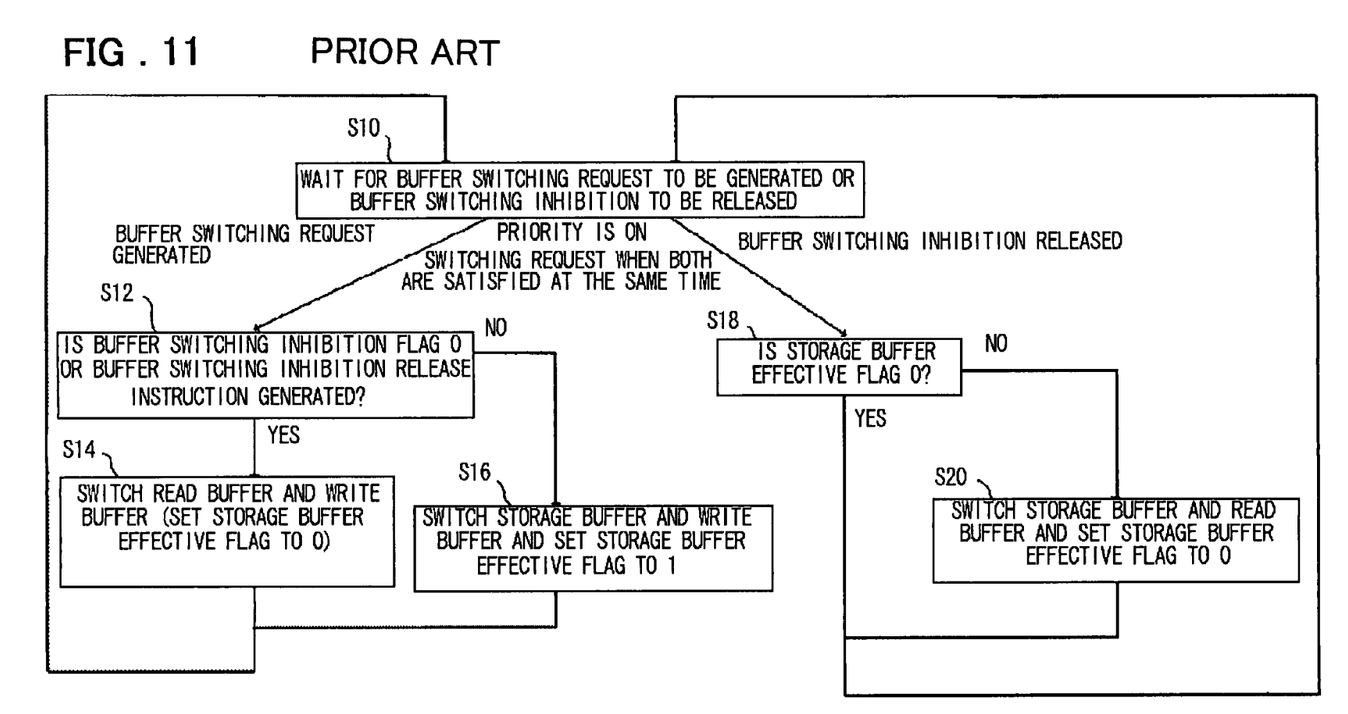
FIG. 11 is a flowchart showing the buffer switching algorithm for the data buffering device shown in FIG. 10.

FIG. 11 is a flowchart showing the buffer switching algorithm described in Patent Document 1. The flag in a buffer switching request register 214 is set to 1 when a data supply unit 100 has written data, and the flag in a buffer switching inhibition register 216 is set to 1 while data is being read by a data reference unit 110. When a buffer switching request is generated, the device checks the flag in the buffer switching inhibition register 216 (step S12). If the flag in the buffer switching inhibition register 216 is 0, the flag indicates that the read buffer is not used. In this case, the read buffer and the write buffer in which the most recent data is written are exchanged (step S14).

On the other hand, if the flag in the buffer switching inhibition register 216 is 1 in step S12 described above, the flag indicates that the read buffer is being used. In this case, the storage buffer and the write buffer area exchanged. After that, a storage buffer effective flag 215 is set to 1 (step S16) to indicate that data more recent than that in the current read buffer is stored in the storage buffer.

If the buffer switching inhibition register 216 is changed to 0 in step S10 described above, the flag indicates that the data reference unit 110 has finished reading data. Therefore, if the storage buffer effective flag 215 is 1 and data is stored in the storage buffer, the read buffer and the storage buffer are exchanged (step S20). If the storage buffer effective flag 215 is 0 and data is not stored in the storage buffer, the current read buffer stores the most recent data and therefore the buffers are not exchanged (return to step S10).

[Patent Document 1]
Japanese Patent Kokai Publication JP-P2001-282650A

SUMMARY OF THE DISCLOSURE

To meet the need for the real-time transfer of moving images and the transfer of data to a large-capacity storage device, a transfer method for transferring data sequentially in a triple-buffer configuration, where both the data transfer speed and the resource unitization are high, is desired.

The problem with the data buffering device disclosed in Patent Document 1 is that, though the device can supply the most recent data to the data reference unit 110, data that is not most recent is discarded. For example, the processing is performed as follows according to the buffer switching algorithm described above. The flag in the buffer switching request register 214 is set to 1 when the most recent data is written and, even if the read buffer contains non-referenced data, the write buffer and the read buffer are switched-over (switched) to give priority to the most recent data (steps S10→S12→S14 in FIG. 11). Therefore, the data in the storage buffer is sometimes discarded or overwritten even if the data is not yet referenced. Similarly, if the read buffer is being read when the most recent data is written, the storage buffer and the write buffer are switched-over regardless of whether the storage buffer stores non-referenced data (steps S10→S12→S16 in FIG. 11).

According to a first aspect of the present invention, a data transfer control device is provided that comprises a physical buffer divisible into at least three buffers; a buffer control device; and selectors for selecting a read buffer from which data is to be read, and a write buffer to which data is to be written, from the buffers according to a command from the buffer control device for transferring data from a data supply unit to a data reference unit. If writing into the write buffer (WR buffer) is finished and a buffer (intermediate buffer) not selected by the selectors does not store unread data at least when reading data is finished, the data transfer control device switches-over the write buffer (WR buffer) and the read buffer (RD buffer). If the buffer (intermediate buffer) not selected by the selectors stores unread data at least when reading data is finished, the data transfer control device switches-over the buffer (intermediate buffer) not selected by the selectors and the read buffer (RD buffer).

According to a second aspect of the present invention, an image processing device is provided that performs a frame buffer control operation comparable to that of the data transfer control device described above.

According to a third aspect of the present invention, a data transfer control method for execution on the data transfer control device described above is provided. In this data transfer control method, the physical buffer is divided at least into three and the buffers are switched-over based on the data storage state so that data is sent sequentially.

The meritorious effects of the present invention are summarized as follows.

The present invention can prevent a data loss and transfer and display a large amount of data speedily and sequentially. This is because a buffering configuration is employed for selecting buffers to be switched-over according to the condition of the intermediate buffer and the state of the write operation at least when reading data from a read buffer is finished.

PREFERRED EMBODIMENTS OF THE INVENTION

Next, preferred embodiments of the present invention will be described in detail using first to third embodiments.

First Embodiment

Figure 1:
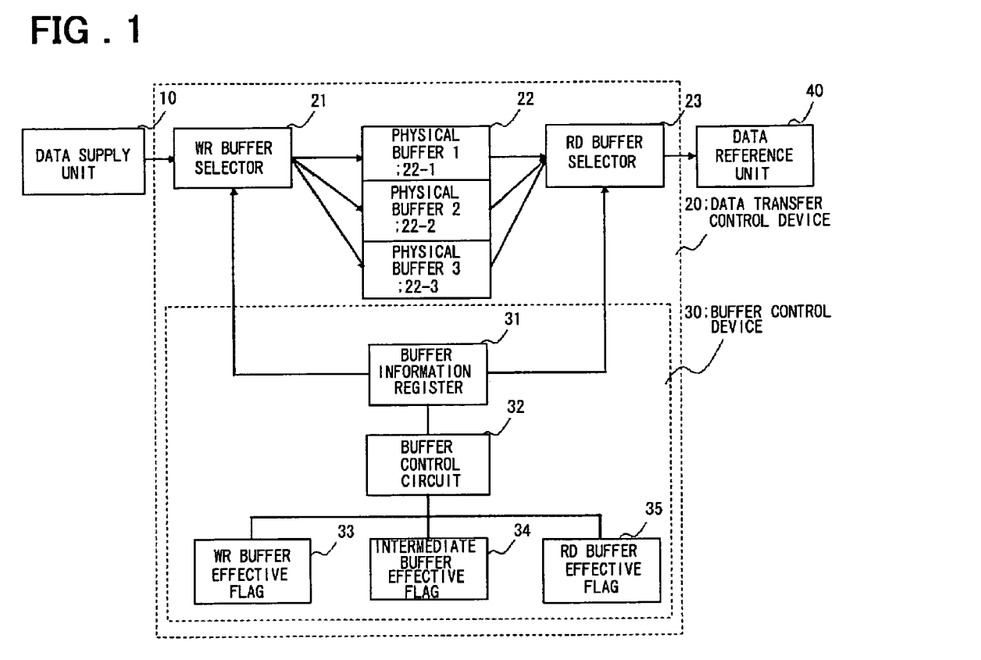
FIG. 1 is a block diagram showing the configuration of a data transfer control device in a first embodiment of the present invention.

FIG. 1 is a block diagram showing the configuration of a data transfer control device in a first embodiment of the present invention. Referring to FIG. 1, a data transfer control device 20 is provided between a data supply unit 10 and a data reference unit 40 to buffer data transferred from the data supply unit 10 and to allow the data reference unit 40 to reference data.

For example, the data supply unit 10 is a CPU on the device side in the USB (Universal Serial Bus) communication, and the data reference unit 40 is a device on the host side.

The data transfer control device 20, which comprises a WR buffer selector (write buffer selector) 21, a physical buffer 22, an RD buffer selector (read buffer selector) 23, and a buffer control device 30, forms a device controller that has buffers (end points) for adjusting the difference of speed between the data supply unit 10 and the data reference unit 40.

The physical buffer 22 is used as three physical buffers, 22-1 to 22-3, of the same size as shown in the figure. The physical buffers 22-1 to 22-3 function as any of a write buffer (WR buffer), a read buffer (RD buffer), and an intermediate buffer.

The WR buffer selector (write buffer selector) 21 and the RD buffer selector (read buffer selector) 23 select one of physical buffers 22-1 to 22-3 according to the information stored in a buffer information register 31 that will be described later.

The following describes the write buffer (WR buffer), the read buffer (RD buffer), and the intermediate buffer. The write buffer (WR buffer), a physical buffer selected by the WR buffer selector (write buffer selector) 21, is accessed when the data supply unit 10 writes data. The read buffer (RD buffer), a physical buffer selected by the RD buffer selector (read buffer selector) 23, is accessed when the data reference unit 40 reads data. The intermediate buffer, a physical buffer selected neither by the WR buffer selector (write buffer selector) 21 nor the RD buffer selector (read buffer selector) 23, is a buffer that can be accessed neither by the data supply unit 10 nor the data reference unit 40.

The buffer control device 30 comprises the buffer information register 31, a buffer control circuit 32, a WR buffer effective flag 33, an intermediate buffer effective flag 34, and an RD buffer effective flag 35.

The buffer information register 31 is a register that holds physical buffer selection information for causing a buffer to work as the write buffer (WR buffer), read buffer (RD buffer), or intermediate buffer. The WR buffer effective flag 33, intermediate buffer effective flag 34, and RD buffer effective flag 35 are flags stored in a storage unit not shown, and each flag indicates whether data not yet referenced is stored in the write buffer (WR buffer), intermediate buffer, or the read buffer (RD buffer). For example, the WR buffer effective flag 33 is turned on when data reading has completed, the RD buffer effective flag 35 is turned off when data writing has completed, and the intermediate buffer effective flag 34 is turned on when data is stored.

The buffer control circuit 32 generates write buffer selection information and read buffer selection information in such a way that the number of switching-over operations is reduced and data is not lost, based on the state of the WR buffer effective flag 33, intermediate buffer effective flag 34, and RD buffer effective flag 35 that are managed in real time as described above, and outputs the generated information to the buffer information register 31. As will be described later in detail with reference to FIG. 4, there are at most six types of selection information.

Figure 2:
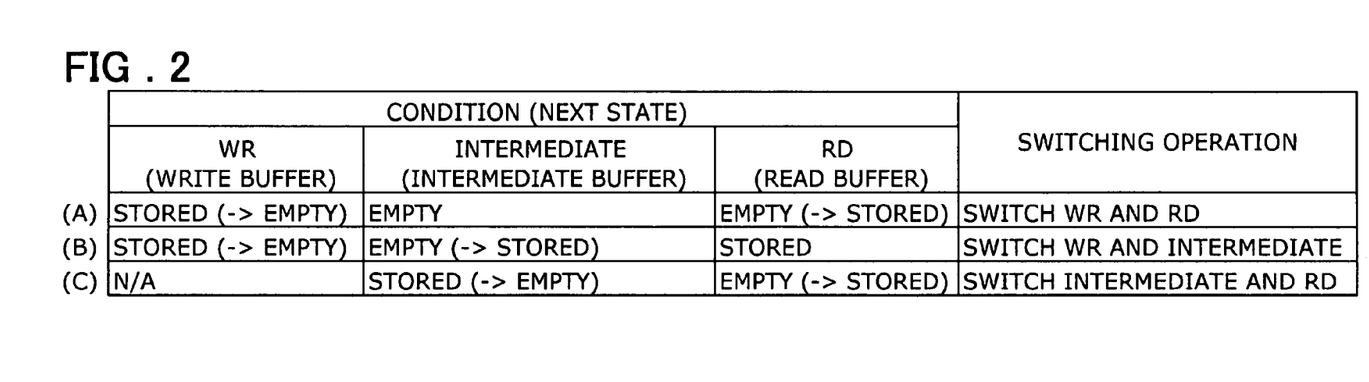
FIG. 2 is a diagram showing the relation between buffer switching conditions (buffer states before and after switching-over) and buffers that are switched-over.

FIG. 2 is a diagram showing the relation between the states of the buffer effective flags (WR buffer effective flag 33, intermediate buffer effective flag 34, and RD buffer effective flag 35) and the buffers that are switched-over. For example, the relation indicated by (A) is as follows. When the WR buffer effective flag 33 indicates that the buffer stores data (on) and the both the intermediate buffer effective flag 34 and the RD buffer effective flag 35 indicate that the buffers are empty (off), the write buffer (WR buffer) and the read buffer (RD buffer) are switched-over (WR-RD switching). In the next state, the write buffer (WR buffer) becomes the read buffer (RD buffer) that stores data (that is, data can be referenced immediately by the data reference unit 40) and the read buffer (RD buffer) transits to an empty write buffer (WR buffer) (that is, data can be written into the buffer immediately by the data supply unit 10).

The relation indicated by (B) is as follows. When the WR buffer effective flag 33 and the RD buffer effective flag 35 indicate that the buffers store data (on) and the intermediate buffer effective flag 34 indicates that the buffer is empty (off), the write buffer (WR buffer) and the intermediate buffer are switched-over. In the next state, the write buffer (WR buffer) becomes the intermediate buffer that stores data (that is, the buffer is put in the queue referenced by the data reference unit 40 for access buffers), and the intermediate buffer transits to an empty write buffer (WR buffer) (that is, data can be written into the buffer immediately by the data supply unit 10).

The relation indicated by (C) is as follows. When the intermediate buffer effective flag 34 indicates that the buffer stores data (on) and the RD buffer effective flag 35 indicates that the buffer is empty (off), the intermediate buffer and the read buffer (RD buffer) are switched-over. In the next state, the intermediate buffer becomes the read buffer (RD buffer) that stores data (that is, data can be referenced immediately by the data reference unit 40), and the read buffer transits to an empty intermediate buffer (that is, the buffer is removed from the queue referenced by the data reference unit 40 for accessing buffers).

Figure 3:
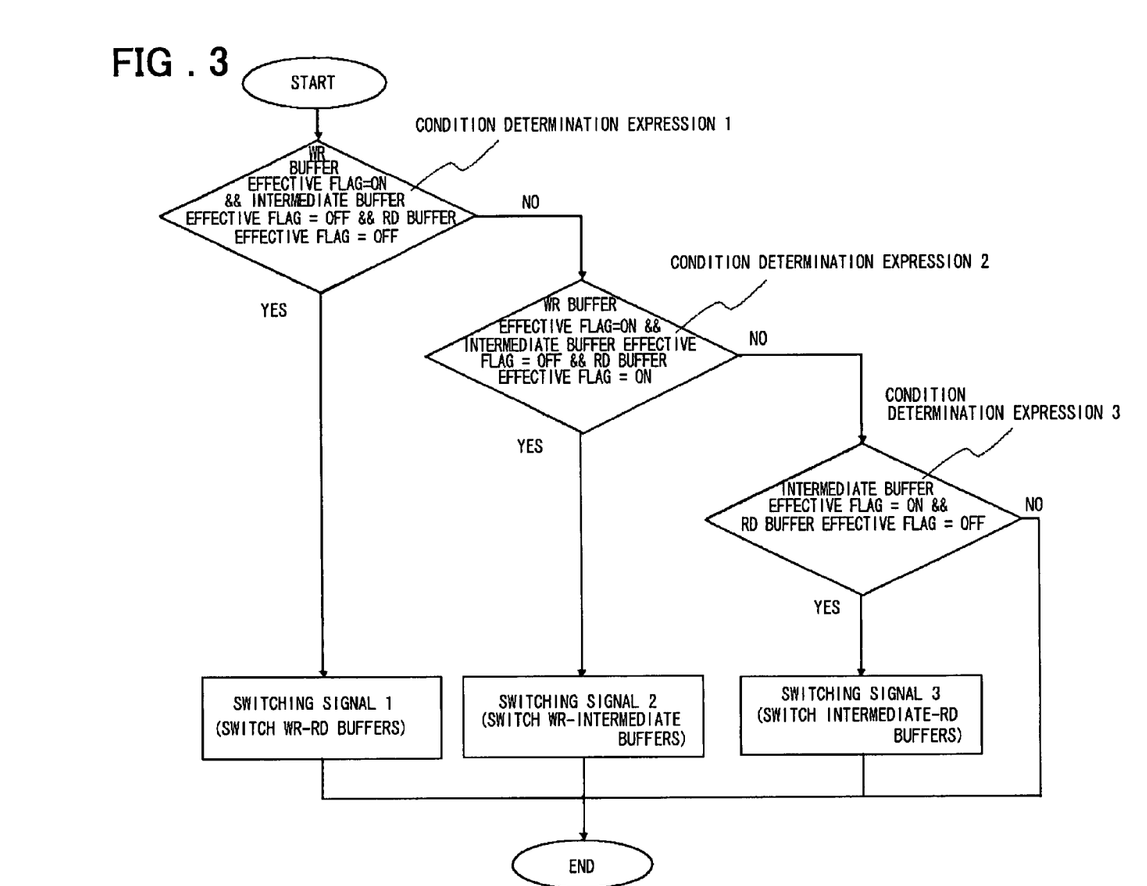
FIG. 3 is a flowchart showing the buffer switching algorithm for the data transfer control device in the first embodiment of the present invention.

FIG. 3 is a flowchart for executing the buffer switching algorithm described above. Referring to FIG. 3, if the condition determination expression (1) corresponding to (A) described above is satisfied, the switching signal 1 is sent to change the contents of the buffer information register 31 to switch-over the write buffer (WR buffer) and the read buffer (RD buffer). If the condition determination expression (2) corresponding to (B) described above is satisfied, the switching signal 2 is sent to change the contents of the buffer information register 31 to switch-over the write buffer (WR buffer) and the intermediate buffer. If the condition determination expression (3) corresponding to (C) described above is satisfied, the switching signal 3 is sent to change the contents of the buffer information register 31 to switch-over the intermediate buffer and the read buffer (RD buffer).

The condition determination expressions described above are not satisfied at the same time and, in all cases, the buffers are switched-over so that data is sent into the direction of the data reference unit 40. Conversely, if none of the condition determination expressions (1)-(3) is satisfied, the buffer switching operation is meaningless; for example, all buffers are empty, all buffers store data, only the read buffer stores data, or only the intermediate buffer and the read buffer store data.

Figure 4:
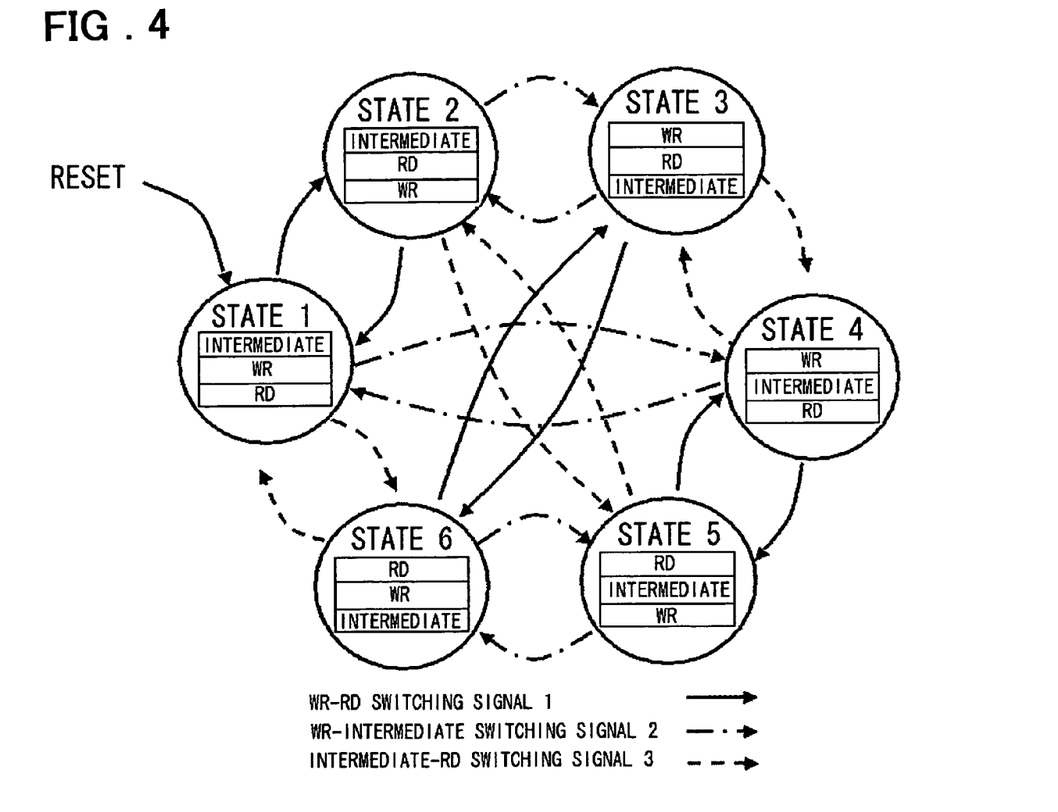
FIG. 4 is a physical buffer state transition diagram in the first embodiment of the present invention.

FIG. 4 is a state transition diagram of the physical buffers in this embodiment. In the figure, "WR" represents the write buffer, "Intermediate" represents the intermediate buffer, and "RD" represents the read buffer. As shown in FIG. 4, the write buffer, the read buffer, and the intermediate buffer are allocated to the physical buffers 22-1 to 22-3 in one of six combinations (3!=3×2×1). By switching-over those states using three types of signals indicated by the arrows in the figure, the buffer in which data is stored can be set as a read buffer (RD buffer) in the sequence under which data is written in those buffers.

According to the buffering method described above, it is possible to quickly switch-over the buffers and prepare the write buffer (WR buffer) if the states of the write buffer (WR buffer) and the intermediate buffer satisfy the relation (B) (condition determination expression 2) described above while the data reference unit 40 is reading the read buffer (RD buffer). Similarly, even during the data supply unit 10 is writing data into the write buffer (WR buffer), it is possible to prepare a buffer, in which data to be read next is stored, as the read buffer (RD buffer) if the states of the intermediate buffer and the read buffer (RD buffer) satisfy the relation (C) (condition determination expression 3) described above.

As described above, the data transfer control device in this embodiment, which checks only the effective flags to determine whether to switch-over buffers, allows the data reference unit to reference data in the sequence, in which data is supplied from the data supply unit, with a fewer number of switching operations. This characteristic is suitable for an application where a large amount of data is transferred speedily and sequentially and is most suitable, for example, for a case where a moving-image stream data frame is transferred in packets. For example, according to the prior art technology, a part of data is sometimes lost before all contents of one frame of data are transmitted and therefore the image cannot be displayed. The data transfer control unit in this embodiment prevents such a condition.

Second Embodiment

Figure 5:
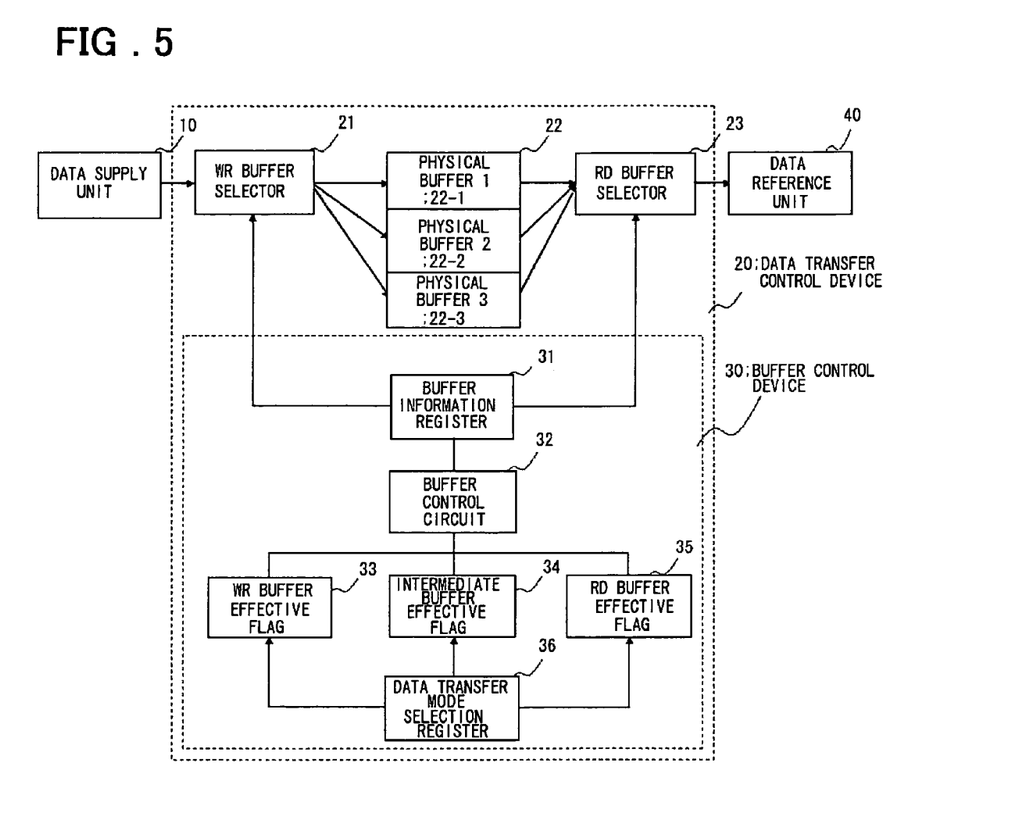
FIG. 5 is a block diagram showing the configuration of a data transfer control device in a second embodiment of the present invention.

Next, a second embodiment of the present invention will be described. FIG. 5 is a block diagram showing the configuration of a data transfer control device in the second embodiment of the present invention. In the description below, those already described in the first embodiment are omitted but only the different part is described.

Referring to FIG. 5, this data transfer control device 20 has the configuration of the data transfer control device in the first embodiment described above to which a data transfer mode selection register 36 is added.

A buffer control circuit 32 in this embodiment transits to one of the two real-time transfer modes described below or to a high-reliability transfer mode according to the value of the data transfer mode selection register 36.

In the first real-time transfer mode, the buffer control circuit 32 changes the RD buffer effective flag to off when the RD buffer effective flag 35 remains on for a predetermined time. That is, if the read buffer (RD buffer) is not referenced for a predetermined time, the buffer control circuit 32 performs the least-recent data discard control operation in which the read buffer (RD buffer) is forced to be changed to rewritable.

In this first real-time transfer mode, the buffer control circuit 32 can discontinue the buffer switching wait state within a predetermined time, thus allowing a large amount of data to be transferred more speedily. Therefore, this mode is suitable for a transfer mode in which the amount of data transferred within a predetermined time must be guaranteed.

In contrast, in the second real-time transfer mode, the buffer control circuit 32 changes the intermediate buffer effective flag to off if all WR buffer effective flag 33, intermediate buffer effective flag 34, and RD buffer effective flag 35 are on. That is, if all physical buffers store data not yet referenced, the buffer control circuit 32 performs the most-recent data priority control operation in which the intermediate buffer is forced to be changed to rewritable.

In this second real-time transfer mode, the buffer control circuit 32 can discontinue the buffer switching wait state within a predetermined time, thus allowing a large amount of data to be transferred more speedily and, yet more, the most-recently written data to be transferred by priority.

In the high-reliability transfer mode, the buffer control circuit 32 changes the RD buffer effective flag 35 to off, not at the time the data reference unit 40 has completed reading data, but when the buffer control circuit 32 receives the reception acknowledgement (ACK) from the data reference unit 40. If the buffer control circuit 32 does not receive the reception acknowledgement (ACK) within a predetermined time, the buffer control circuit 32 performs the data guarantee priority control for the data to be transferred.

In this high-reliability transfer mode, data is transferred under the buffer switching control described above and, at the same time, with priority given to the guarantee of data.

As described above, the embodiment in which the data transfer mode selection register 36 is provided gives the user the ability to support the transfer modes for the USB (Universal Serial Bus).

Third Embodiment

Figure 6:
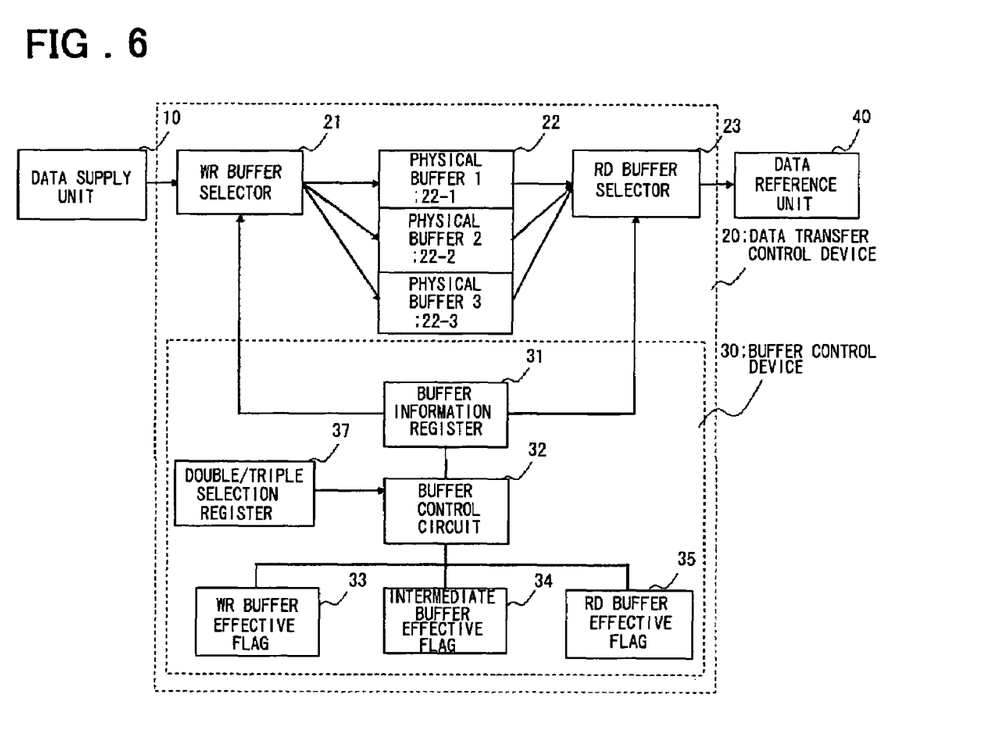
FIG. 6 is a block diagram showing the configuration of a data transfer control device in a third embodiment of the present invention.

Next, a third embodiment of the present invention will be described. FIG. 6 is a block diagram showing the configuration of a data transfer control device in the third embodiment of the present invention. In the description below, those already described in the first embodiment are omitted but only the different part is described.

Referring to FIG. 6, this data transfer control device 20 has the configuration of the data transfer control device in the first embodiment described above to which a double/triple selection register 37 is added.

Figure 7:
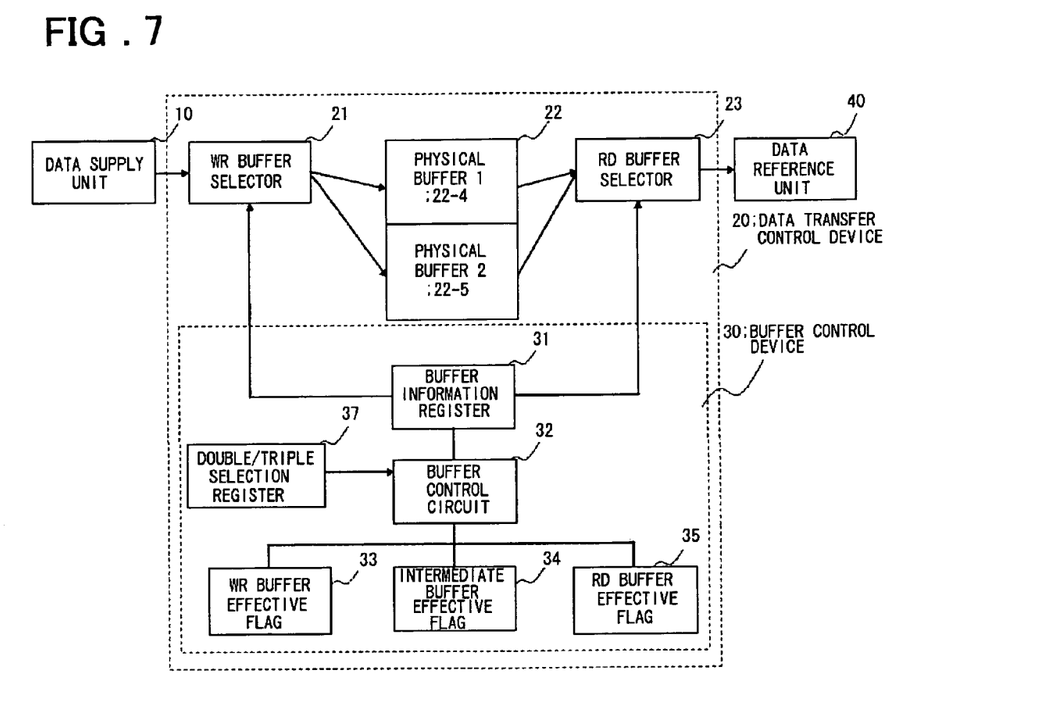
FIG. 7 is another block diagram showing the configuration of the data transfer control device in the third embodiment of the present invention.

A buffer control circuit 32 in this embodiment can have one of two buffer modes according to the value in the double/triple selection register 37: a triple-buffer mode in which three physical buffers 22-1 to 22-3 are used and the double-buffer mode in which two physical buffers 22-4 and 22-5 shown in FIG. 7 are used.

Figure 8:
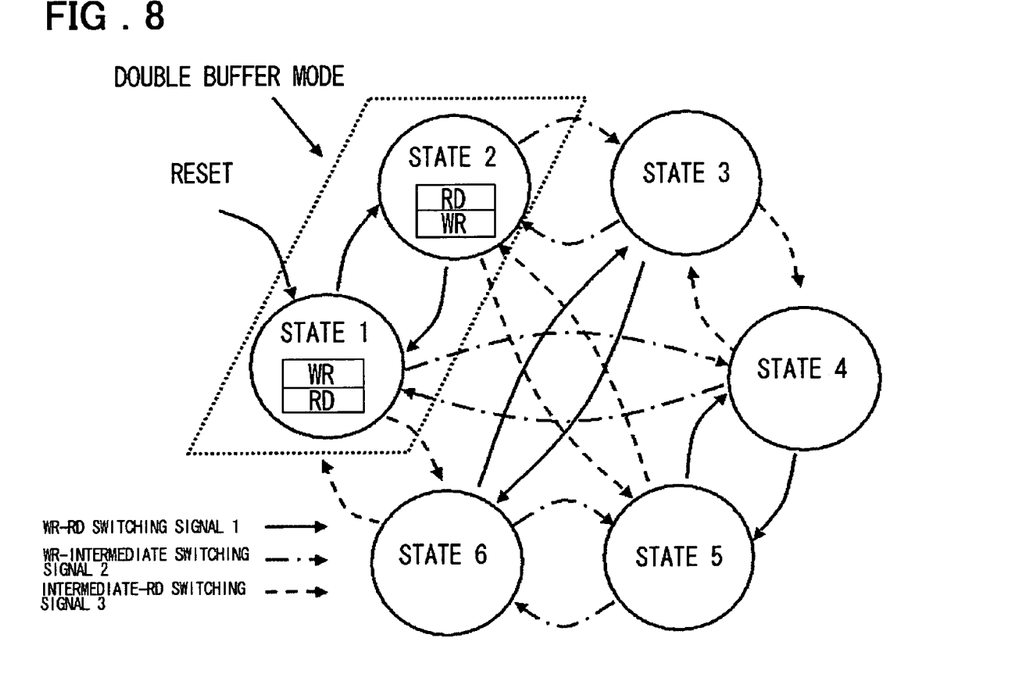
FIG. 8 is a physical buffer state transition diagram in double-buffer control mode in the third embodiment of the present invention.

FIG. 8 is a state transition diagram in the double-buffer mode. In the figure, "WR" represents the write buffer and "RD" represents the read buffer. Because there is no intermediate buffer in the double-buffer mode as shown in FIG. 8, only an RD-WR switching signal 1 is sent for switching-over between the write buffer (WR buffer) and the read buffer (RD buffer). For example, a triple-buffer mode condition is added to the condition determination expressions 2 and 3 described above (FIG. 3) to prevent the switching signals 2 and 3 from being generated in the double-buffer mode, or the processing is changed to mask the switching signals 2 and 3 in the double-buffer mode, to prevent the intermediate buffer from being involved in the switching. By dosing so, a transition occurs in the double-buffer mode only between State 1 and State 2 by the RD-WR switching signal 1. This configuration allows the buffer switching algorithm, that is, the determination circuit, to be shared between the triple-buffer mode and the double-buffer mode.

As described above, in this embodiment in which the double/triple selection register 37 is provided to change the buffer configuration, the resources can be fully utilized when there is no difference in speed between the data supply side and the data reference side. Another advantage is that the algorithm can be used without being modified. Therefore, this configuration eliminates the need for modifying the firmware to ensure compatibility between different buffer configurations and, at the same time, minimizes an increase in the cost and the circuit size.

Figure 9:
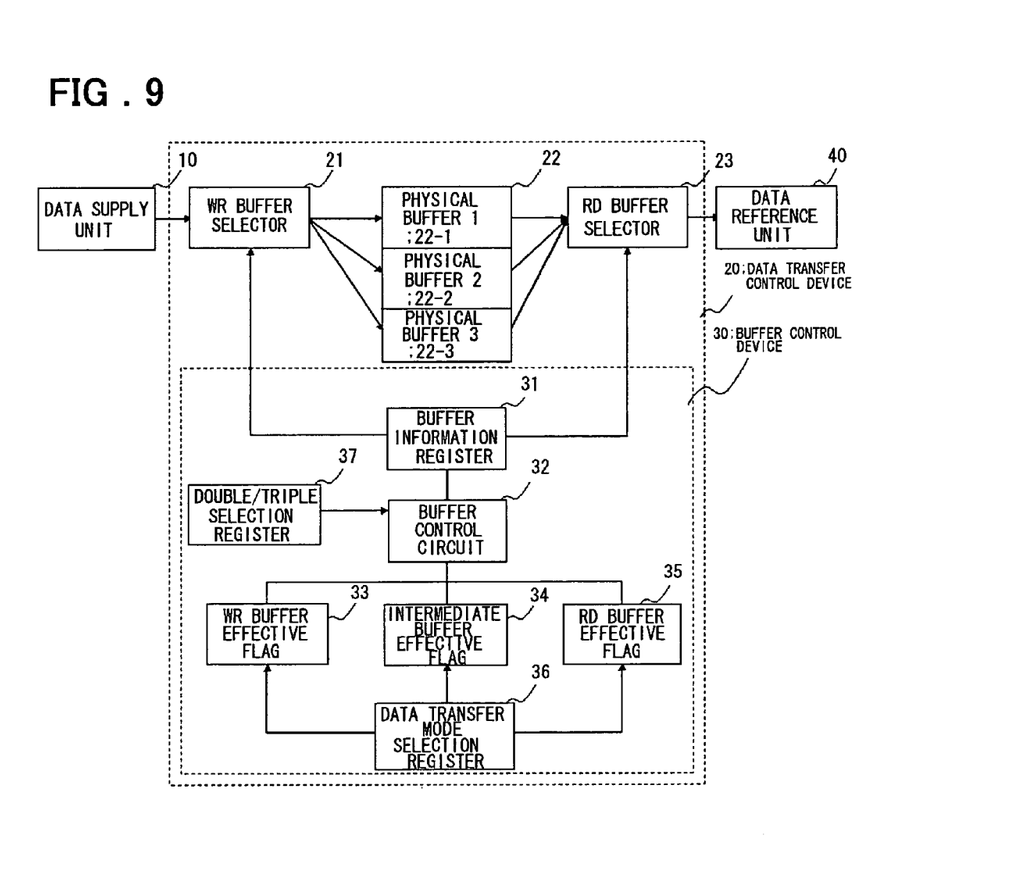
FIG. 9 is a block diagram showing another example of the configuration of the data transfer control device of the present invention.

Although the preferred embodiments of the present invention have been described, it is to be understood that the technical scope of the present invention is not limited to those embodiments and that various other changes and replacements may be made without departing from the spirit of the present invention. For example, in the configuration where both the data transfer mode selection register 36 and the double/triple selection register 37 are provided as shown in FIG. 9, both effects described above can be achieved.

The present invention having the characteristics described above is applicable not only to the USB device mentioned above but also to various device controllers and image processing devices that transfer data in packets based on a protocol provided for transferring data in packets such as IEEE 1394 or Ethernet (registered trademark).

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data transfer control device comprising:
   first, second and third buffers;
   a buffer control device that controls reading processing from the first buffer and writing processing into the second buffer; and
   selectors for selecting the first through third buffers;
   wherein, when said reading processing and said writing processing have been finished, said buffer control device issues either a first command or a second command to said selector depending upon whether the third buffer does or does not store data,
   in a case in which the third buffer does not store data, the buffer control device issues the first command that corresponds to a command to perform switching-over between said second buffer and said first buffer, and
   in a case in which the third buffer stores data, the buffer control device issues the second command that corresponds to a command to perform switching-over between said third buffer and said first buffer,
   wherein said buffer control device comprises:
   a storage unit that has a write buffer effective flag that is set on when said writing processing into said second buffer is completed, a read buffer effective flag that is set off when said reading processing from said first buffer is completed, and an intermediate buffer effective flag that is set on when said third buffer stores data; and
   a buffer control circuit that controls states of the write buffer effective flag, the read buffer effective flag, and the intermediate buffer effective flag,
   wherein said selector issues, to said buffer control circuit, a command to invert the states of the buffer effective flags corresponding to two buffers to be subjected to switching-over processing among said first through third buffers when said switching-over processing is performed.

2. The data transfer control device as defined by claim 1, wherein, in a case in which said first buffer stores data and said third buffer does not store data when writing processing of said buffer control device is finished and reading processing of said buffer control device has not yet finished, said buffer control device issues a command of switching-over between said second buffer and said third buffer.

3. The data transfer control device as defined by claim 1, further comprising:
   a data transfer mode selection register that stores a data transfer mode selection state;
   wherein, in a case in which said first buffer is not referenced for a predetermined time when a predetermined value is set in said data transfer mode selection register, said buffer control circuit clears said first buffer.

4. The data transfer control device as defined by claim 1, further comprising:
   a data transfer mode selection register that stores a data transfer mode selection state,
   wherein, in a case in which all buffers are not referenced for a predetermined time when a predetermined value is set in said data transfer mode selection register, said buffer control circuit clears said third buffer.

5. The data transfer control device as defined by claim 1, further comprising:
   a data transfer mode selection register that stores a data transfer mode selection state,
   wherein, when a predetermined value is set in said data transfer mode selection register, said buffer control circuit clears said first buffer after receiving a reception acknowledgement from a data reference side.

6. The data transfer control device as defined by claim 1, further comprising:
   a buffer division selection register for switching-over a number of buffer divisions, wherein, when a predetermined value is set in said buffer division selection register, said buffer control circuit forms double buffers using said first through third buffers for executing a FIFO (First In First Out) control operation.

7. An image processing device comprising:
   said data transfer control device as defined in claim 1.

8. An image processing device comprising said data transfer control device as defined by claim 2.

9. An image processing device comprising said data transfer control device as defined by claim 3.

10. An image processing device comprising said data transfer control device as defined by claim 4.

11. An image processing device comprising said data transfer control device as defined by claim 5.

12. An image processing device comprising said data transfer control device as defined by claim 6.

13. A data transfer control method for use by a data transfer control device for transferring data from a data supply unit to a data reference unit, said data transfer control unit comprising:

first, second and third buffers; and a buffer control device for controlling reading processing from said first buffer and writing processing into said second buffer, said data transfer control method comprising the processing, by said data transfer control device, of:

a first switching-over processing that switches-over between said second buffer and said first buffer in a case in which said writing processing is finished and said third buffer does not store any data when said reading processing is finished;

a second switching-over processing that switches-over between said third buffer and said first buffer in a case in which said third buffer does store data when said reading and writing processings are finished;

providing a write buffer effective flag that is set on when writing into said second buffer is completed, a read buffer effective flag that is set off when reading from said first buffer is completed, an intermediate buffer effective flag that is set on when said third buffer stores data, and a buffer control circuit that controls the states of the three buffer effective flags; and inverting the states of the buffer effective flags corresponding to two buffers that are subjected to said switching-over processing among said first through third buffers, when the switching-over processing is performed.

14. The data transfer control method as defined by claim 13, further comprising:

a third switching-over processing that switches-over between said second and third buffers in a case in which said first buffer stores data and said third buffer does not store data, when writing processing is finished and reading processing has not yet finished.

15. The data transfer control device as defined by claim 1, further comprising means for determining whether or not the third buffer stores data at a time when the reading and writing processings are finished, wherein said buffer control device outputs either the first command or the second command based on information of the third buffer as provided by the means for determining.

16. The data transfer control method as defined by claim 13, further comprising:

determining whether or not the third buffer stores data at a time when the reading and writing processings are finished, wherein said buffer control device performs either the first switching-over processing or the second switching-over processing based on a result of the determining step.

17. The data transfer control device as defined by claim 1, wherein a sole trigger for said buffer control device outputting either said first command or said second command is whether or not said third buffer currently stores data that has not been previously read out from said third buffer.

* * * * *